US005193045A

United States Patent [19]
Kochi et al.

[11] Patent Number: 5,193,045
[45] Date of Patent: Mar. 9, 1993

[54] HELICAL SCAN TYPE MAGNETIC RECORDING AND/OR REPRODUCING APPARATUS HAVING COMBINATION TYPE VIDEO HEAD AND FLYING ERASE HEAD FOR LOW VIBRATION

[75] Inventors: Masanori Kochi; Juichi Morikawa; Hideo Zama; Makoto Ibe, all of Katsuta, Japan

[73] Assignee: Hitachi, Ltd., Tokyo, Japan

[21] Appl. No.: 723,182

[22] Filed: Jun. 28, 1991

[30] Foreign Application Priority Data

Jul. 13, 1990 [JP] Japan .................................. 2-183904

[51] Int. Cl.$^5$ .............................................. G11B 5/027
[52] U.S. Cl. ......................................... 360/84; 360/107
[58] Field of Search ............................ 360/107, 84, 85

[56] References Cited

U.S. PATENT DOCUMENTS 4,849,839 7/1989 Tsubota .................................. 360/84

Primary Examiner—A. J. Heinz
Attorney, Agent, or Firm—Antonelli, Terry, Stout & Kraus

[57] ABSTRACT

A flying erase head for flying erasing which is used for improving the picture quality is provided on a rotating drum so as to be spaced substantially 180 degrees from the video head having first and second video head chips integrally fixed on a video head base. Therefore, a high picture-quality helical scan type magnetic recording and/or reproducing apparatus can be provided which is able to prevent the picture quality from being deteriorated by the vibration of the video head due to the rotation, and to satisfactorily make the over-writing on the tape and the assemble mode operation upon recording.

2 Claims, 3 Drawing Sheets

HELICAL SCAN TYPE MAGNETIC RECORDING AND/OR REPRODUCING APPARATUS HAVING COMBINATION TYPE VIDEO HEAD AND FLYING ERASE HEAD FOR LOW VIBRATION

BACKGROUND OF THE INVENTION

This invention relates to the technique for increasing the picture quality and decreasing the vibration in helical scan type magnetic recording and/or reproducing an apparatus.

The conventional helical scan type magnetic recording and/or reproducing apparatus, as described in, for example, JP-A-59-37783, has a combination-type video head (hereinafter, referred to as "DA (double azimuth) head") which has first and second video head chips integrally bonded and fixed to a video head base and which is simply mounted on the lower end surface of the rotating drum in order to reduce the size and weight.

SUMMARY OF THE INVENTION

The above conventional apparatus has a single DA head mounted on the lower end surface of the rotating drum, but no considerations for increasing the picture quality and decreasing the vibration.

It is an object of the invention to provide a helical scan type magnetic recording and/or reproducing apparatus with the above drawbacks obviated and with high picture quality and low vibration.

The feature of this invention is that for achieving the above object the flying erase head for flying erasing (hereinafter, referred to as "FE head") which has so far been used for improving the picture quality is provided on the lower end surface of the rotating drum, and that for decreasing the vibration the FE head is angularly spaced substantially 180 degrees from the DA head.

It is of course desired to make the values of $M_d \times R_d$ and $M_f \times R_f$ substantially equal where $M_d$ is the mass of the DA head, $M_f$ is the mass of the FE head, $R_d$ is the distance between the center of gravity of the DA head and the rotation center of the rotating drum, and $R_f$ is the distance between the center of gravity of the FE head and the rotation center the rotating drum.

The use of the FE head eliminates the necessity for over-writing on the recorded area in assemble mode and insert mode, and thus no rainbow noise occurs, resulting in clear video images.

In addition, since the FE head is angularly spaced substantially 180 degrees from the DA head, the rotation balance can be improved, and thus the helical scan type magnetic recording and/or reproducing apparatus has low vibration.

DESCRIPTION OF THE PREFERRED EMBODIMENTS

One embodiment of the present invention will be described with reference to FIGS. 1 and 2.

Figure 1:
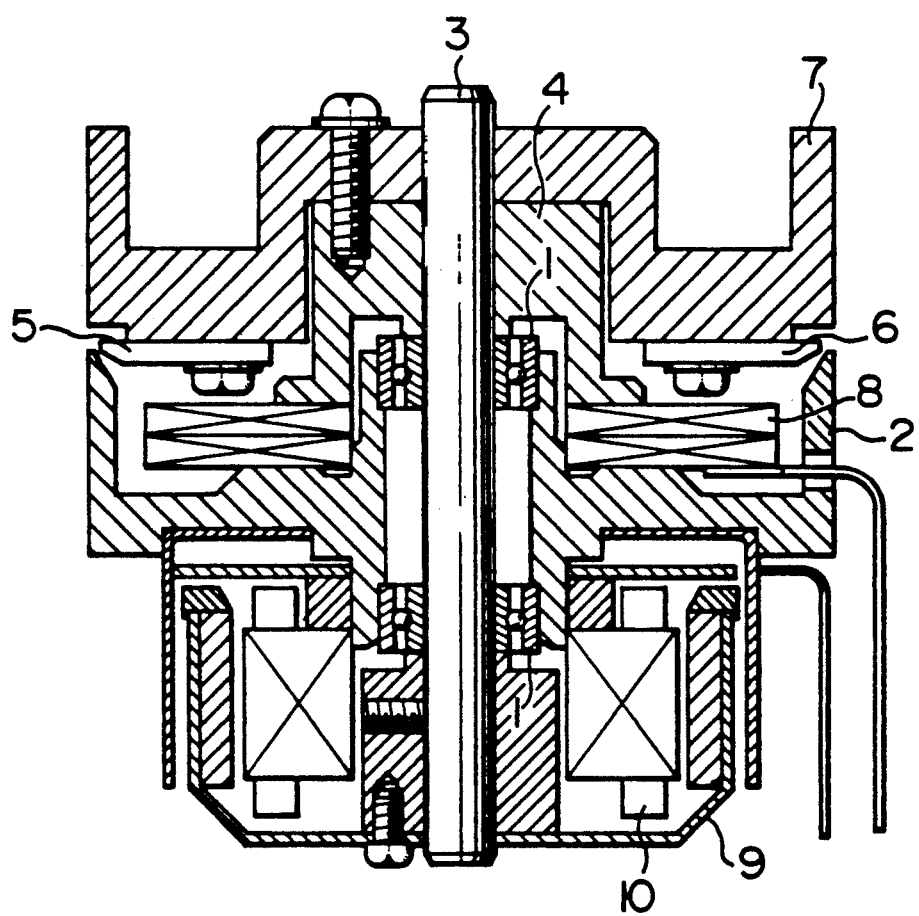
FIG. 1 is a cross-sectional view of one embodiment of this invention.

FIG. 1 is a cross-sectional diagram of one embodiment of the present invention. Referring to FIG. 1, there are shown a ball bearing 1, a lower cylinder 2, and a shaft 3 which is rotatably supported on the lower cylinder 2 through the ball bearing 1. A disk 4 is fixedly fitted on the upper end of the shaft 3. On the top of the disk 4 is fixed a rotating drum 7 which has a DA head 5 and an FE head 6 secured thereon, and on the bottom side of the disk 4 is fixedly bonded a rotary transformer 8.

Moreover, a rotor magnet 9 for drive is fixed to the lower end of the shaft 3 and forced to drive (rotate) by a stator 10 with a coil wound thereon.

Figure 2:
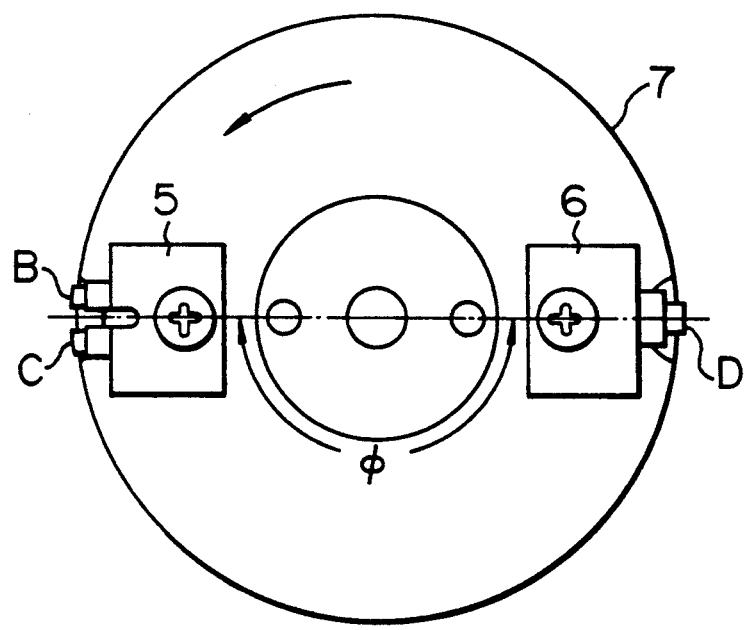
FIG. 2 is a bottom view of a rotating drum assembly showing the embodiment of the invention.

FIG. 2 is a bottom view of the rotating drum assembly of the embodiment of the invention. In the DA head 5, the first video head chip is indicated by B and the second video head chip by C. In the FE head 6, the flying erase head chip is indicated by D. The first video head chip B and the second video chip C are different in the azimuth angle not to be affected by the adjacent tracks.

The helical scan type magnetic recording and/or reproducing apparatus of the embodiment has been described above, and for making the effect of the present invention more clear a conventional example will be described below.

Figure 3:
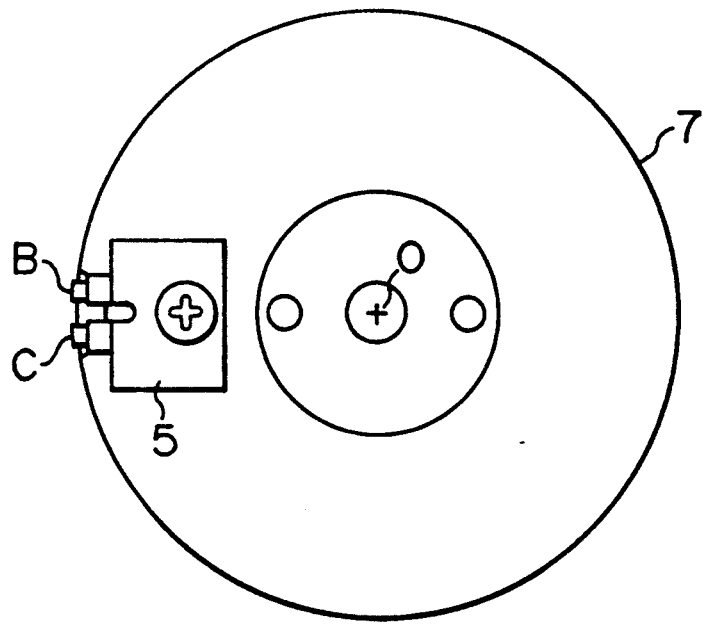
FIG. 3 is a bottom view of the conventional rotating drum.

FIG. 3 is a bottom view of the rotating drum assembly of a conventional example. The construction of the DA head 5 is the same as that of the embodiment of the invention, and will not be described. This construction is unbalanced with respect to the rotation center 0, and thus it is clear that a vibration occurs in synchronism with the rotation.

In addition, since no FE head is provided, over-writing is made on the recorded area in assemble mode and insert mode, thus causing rainbow noise.

This invention, in order to obviate this drawback, takes the construction that as shown in FIG. 2 the FE head 6 for flying erase is provided to be spaced substantially 180 degrees from the DA head 5, or to oppose it, and that the values of $M_d \times R_d$ and $M_f \times R_f$ are made substantially equal where $M_d$ is the mass of the DA head 5, $M_f$ is the mass of the FE head 6, $R_d$ is the distance between the center of gravity of the DA head 5 and the rotation center of the rotating drum, and $R_f$ is the distance between the center of gravity of the FE head 6 and the rotation center of the rotating drum.

Figure 4:
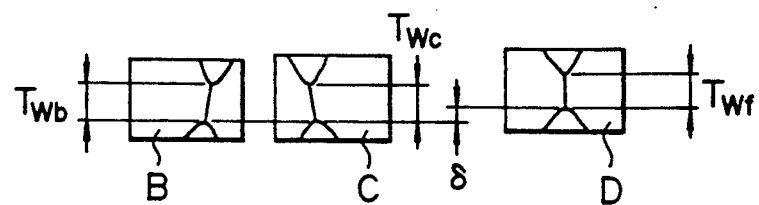
FIG. 4 is an explanatory diagram showing an external view of head chips for explaining positional relationship thereamong.

FIG. 4 is an explanatory diagram showing an external view of the head chips B and C of the DA head 5 and the head chip D of the FE head for explaining positional relationship thereamong, wherein the DA head 5 and the FE head are mounted on the rotating drum shown in FIG. 2.

As illustrated in FIG. 4, the first video head chip B has a head width of $T_{Wb}$, the second video head chip C has a head width of $T_{Wc}$, and the flying erase head chip D has a head width of $T_{Wf}$. A level difference (positional difference) $\delta$ is also provided as shown in FIG. 4. The setting of the level difference $\delta$ will be described later.

Figure 5:
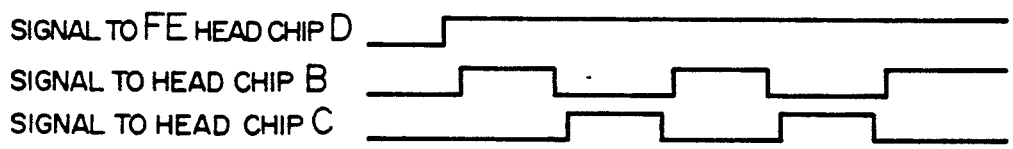
FIG. 5 is a diagram of timing signals to the head chips.
Figure 6:
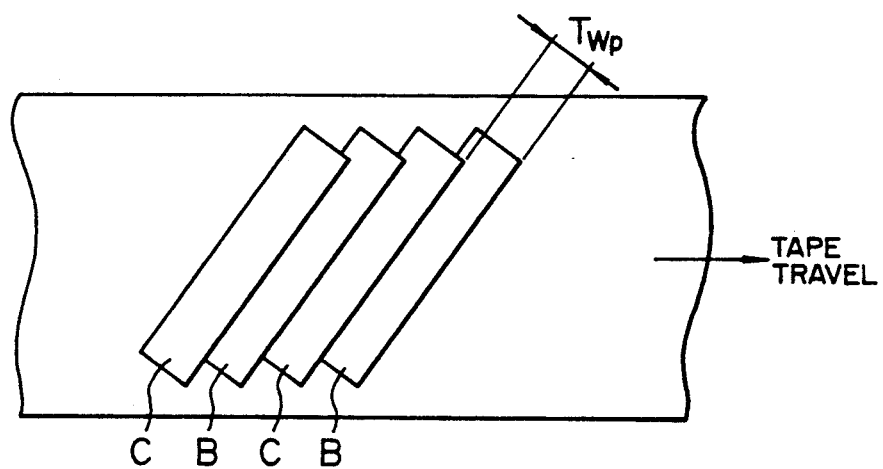
FIG. 6 is a diagram of recorded tracks on a tape.

FIG. 5 is a timing diagram of timing signals to the DA head and FE head shown in FIG. 2, and FIG. 6 is a diagram showing a pattern of recorded tracks formed on the tape in accordance with the timing chart of FIG. 5.

A constant signal as shown in FIG. 5 is continuously supplied to the FE head chip D, thus erasing the information on the tracks of the tape. To the first and second video head chips B and C are supplied the signals shown in FIG. 5 so that as shown in FIG. 6 recorded tracks are formed at a track pitch of $T_{Wp}$ on the erased tracks alternately by the first and second video head chips B and C.

Therefore, in order to erase the recorded tracks formed at a pitch of $T_{Wp}$, it is necessary that the head width $T_{Wf}$ of the flying erase head chip D satisfy $T_{Wf} \geq T_{Wp}$.

On the other hand, the level difference δ shown in FIG. 4 can be expressed as $$\delta = T_{Wp} \times \frac{\phi}{360°}$$

where $\phi$ is the mounting angle of the flying erase head D as indicated in FIG. 2. In the embodiment, since $\phi$ is selected to be 180°, δ is given as $$\delta = \tfrac{1}{2} T_{Wp}$$

Thus, the FE head 6 for flying erasing is able to completely remove the rainbow noise which is the problem in the prior art. Also, since the FE head 6 is mounted to be spaced substantially 180 degrees from the DA head 5 and the values of $M_d \times R_d$ and $M_f \times R_f$ are made substantially equal, it is possible to remove the vibration occurring in synchronism with the rotation due to the unbalanced structure in the prior art.

According to this invention, in the helical scan type magnetic recording and/or reproducing apparatus having a combination type video head (DA head) which has first and second video head chips integrally bonded and fixed on the video head base and which is secured to the lower and surface of the rotating drum, the flying erase head (FE head) for flying erasing is provided on the lower end surface of the rotating drum so as to be spaced substantially 180 degrees from the DA head, thus enabling high picture quality and low vibration to be simultaneously realized.

What is claimed is:

1. A helical scan type magnetic recording and/or reproducing apparatus having a combination type video head which has first and second video head chips fixed on a video head base and which is mounted on a rotating drum, wherein a flying erase head for erasing is provided on said rotating drum so as to be spaced substantially 180 degrees from said video head, and wherein the values of $M_d \times R_d$ and $M_f \times R_f$ are made substantially equal where $M_d$ is the mass of said combination head, $R_d$ is the distance between the center of gravity of said combination head and the rotation center of said rotating drum, $M_f$ is the mass of said flying erase head, and $R_f$ is the distance between the center of gravity of said flying erase head and the rotation center of said rotating drum.

2. A helical scan type magnetic recording and/or reproducing apparatus having a combination type vide head which has first and second video head chips fixed on a video head base and which is mounted on a rotating drum, wherein a flying erase head for erasing is provided on said rotating drum so as to be spaced substantially 180 degrees from said video head, and wherein a condition of $T_{Wf} = T_{Wp}$ is satisfied where $T_{Wf}$ is the head width of said flying erase head and $T_{Wp}$ is the recorded track pitch of a video signal.

* * * * *